US012711105B2

(12) United States Patent
Kavanagh et al.

(10) Patent No.: US 12,711,105 B2
(45) **Date of Patent: *Aug. 18, 2026**

(54) THREAD SAFE LOCK-FREE CONCURRENT WRITE OPERATIONS FOR USE WITH MULTI-THREADED IN-LINE LOGGING

(71) Applicant: Chicago Mercantile Exchange Inc., Chicago, IL (US)

(72) Inventors: Kyle D. Kavanagh, Chicago, IL (US); Andrew Pikler, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,513

(22) Filed: Oct. 18, 2023

(65) Prior Publication Data

US 2024/0070121 A1 Feb. 29, 2024

Related U.S. Application Data

(63) Continuation of application No. 14/707,614, filed on May 8, 2015, now Pat. No. 11,829,333.

(51) Int. Cl.
*G06F 16/176* (2019.01)

(52) U.S. Cl.
CPC ................................ *G06F 16/1767* (2019.01)

(58) Field of Classification Search
CPC .................................................. G06F 16/1767
See application file for complete search history.

(56) References Cited

U.S. PATENT DOCUMENTS

| | | | |
|---|---|---|---|
| 5,226,155 | A | 7/1993 | Tijima |
| 5,671,377 | A | 9/1997 | Bleidt et al. |
| 5,826,052 | A | 10/1998 | Stiles et al. |
| 6,088,758 | A | 7/2000 | Kaufman et al. |
| 7,280,398 | B1 | 10/2007 | Lee |
| 7,421,446 | B1 | 9/2008 | Bruso et al. |
| 2003/0217058 | A1 | 11/2003 | Ladan-mozes et al. |
| 2005/0039049 | A1 | 2/2005 | Chang et al. |

(Continued)

OTHER PUBLICATIONS

Anonymous, Log Rotation, Nov. 3, 2014, Wikipedia.

(Continued)

*Primary Examiner* — Brittany N Allen
(74) *Attorney, Agent, or Firm* — Lempia Summerfield Katz LLC

(57) ABSTRACT

The disclosed embodiments relate to a mechanism for allowing concurrent access, e.g., write operations, to a data structure, e.g., a file, which may have limited capacity, by multiple processes or threads and, in particular, for allowing concurrent, or otherwise substantially simultaneously, appending of data to the file thereby. Each process/thread requests the amount of space it needs to append its data. Upon request, the disclosed mechanism allocates and reserves the requested amount of space and allows the requesting process/thread to commence its append operation. Subsequent to the commencement of the append operation, another thread is then free to request space for its needs and commence its append operation concurrently, or otherwise substantially simultaneously, with the previous append operation, i.e. before the prior append operation is completed.

22 Claims, 6 Drawing Sheets

(56) References Cited

U.S. PATENT DOCUMENTS

| | | | |
|---|---|---|---|
| 2005/0066095 | A1 | 3/2005 | Mullick et al. |
| 2008/0022068 | A1 | 1/2008 | Taillefer |
| 2008/0288738 | A1 | 11/2008 | Gokhale et al. |
| 2011/0179247 | A1 | 7/2011 | Mine et al. |
| 2012/0047154 | A1 | 2/2012 | Lin et al. |
| 2012/0066191 | A1 | 3/2012 | Chang et al. |
| 2012/0131286 | A1 | 5/2012 | Faith et al. |
| 2012/0210021 | A1 | 8/2012 | Flynn et al. |
| 2013/0111474 | A1 | 5/2013 | Agarwal et al. |
| 2013/0145106 | A1 | 6/2013 | Kan |
| 2013/0159620 | A1 | 6/2013 | Sakashita et al. |
| 2014/0019684 | A1 | 1/2014 | Wei |
| 2014/0115016 | A1 | 4/2014 | Perrin et al. |
| 2014/0201482 | A1 | 7/2014 | Dudgeon et al. |
| 2014/0237195 | A1 | 8/2014 | Holland et al. |
| 2015/0067421 | A1 | 3/2015 | Baptist |
| 2015/0154087 | A1 | 6/2015 | Jin et al. |
| 2016/0092124 | A1* | 3/2016 | Cowling ............... G06F 3/0688 711/103 |
| 2016/0110403 | A1 | 4/2016 | Lomet et al. |
| 2016/0328175 | A1 | 11/2016 | Zhang |

OTHER PUBLICATIONS

Extended European Search Report, from EP Application No. 16793246, Oct. 5, 2018.

Gil Tene, WirterReaderPhaser: A Story About a New (?) Synchronization Primitive, Stuff Gil Says, Nov. 16, 2014, 14 pages.

Github, "Efficient Reliable Unicast and Multicast Message Transport", real-logic / Aeron, 2015, 4 pages, https://github.com/real-logic/Aeron.

International Search Report and Written Opinion, from PCT/US16/31176, Aug. 11, 2016, WO.

* cited by examiner

114
RADIO
132
TRADE ENGINE
138
EXCHANGE COMPUTER SYSTEM
100
ACCOUNT DATA MODULE
106
MARKET DATA MODULE
112
OTHER PROCESSOR MODULE
136
WIRELESS HUB
128
ACCOUNT DATA MODULE
104
ORDER BOOKS MODULE
110
COMMUNI- CATION MODULE
140
USER DATABASE
102
TRADE DATABASE
108
RISK MANAGEMENT MODULE
134
122
118
116
LAN
124
WAN
126
MARKET MAKER
130
Management
160
120

Figure 2:
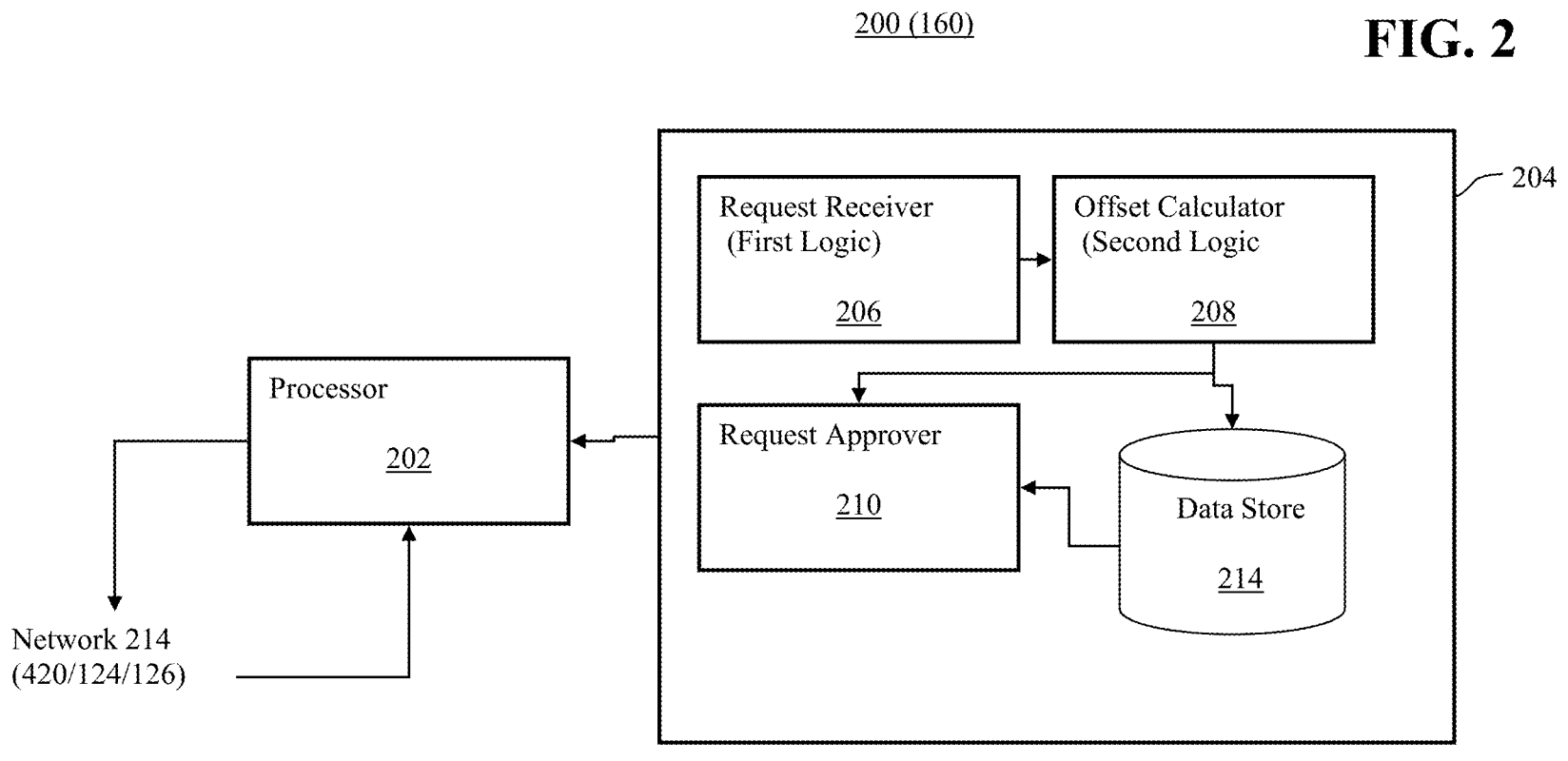

Request Receiver (First Logic) 206

Offset Calculator (Second Logic) 208

Data Store 214

Request Approver 210

Processor 202

Network 214 (420/124/126)

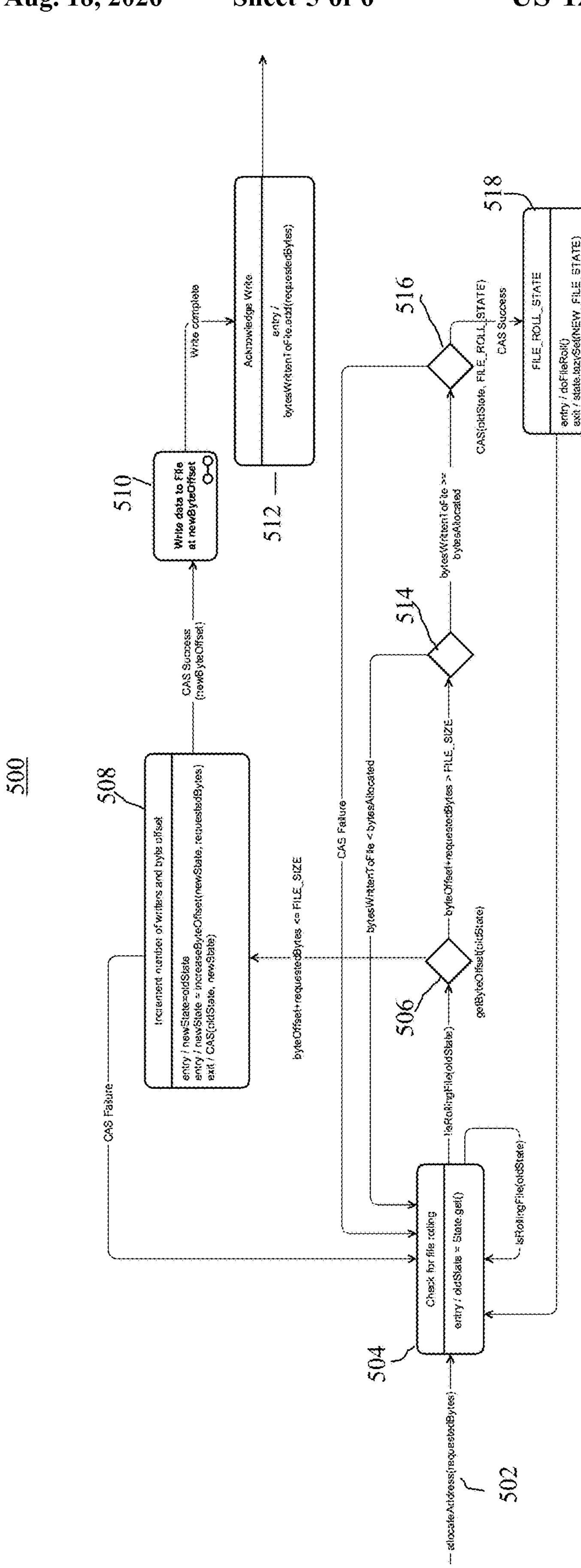
FIG. 5
500
502
allocateAddress(requestedBytes)
504
Check for file rolling
entry / oldState = State.get()
!isRollingFile(oldState)
isRollingFile(oldState)
506
getByteOffset(oldState)
byteOffset+requestedBytes <= FILE_SIZE
byteOffset+requestedBytes > FILE_SIZE
508
Increment number of writers and byte offset
entry / newState=oldState
entry / newState = increaseByteOffset(newState, requestedBytes)
exit / CAS(oldState, newState)
CAS Failure
CAS Success (newByteOffset)
510
Write data to File at newByteOffset
Write complete
512
Acknowledge Write
entry / bytesWrittenToFile.add(requestedBytes)
514
bytesWrittenToFile < bytesAllocated
bytesWrittenToFile >= bytesAllocated
516
CAS(oldState, FILE_ROLL_STATE)
CAS Success
CAS Failure
518
FILE_ROLL_STATE
entry / doFileRoll()
exit / state.lazySet(NEW_FILE_STATE)

Figure 6:
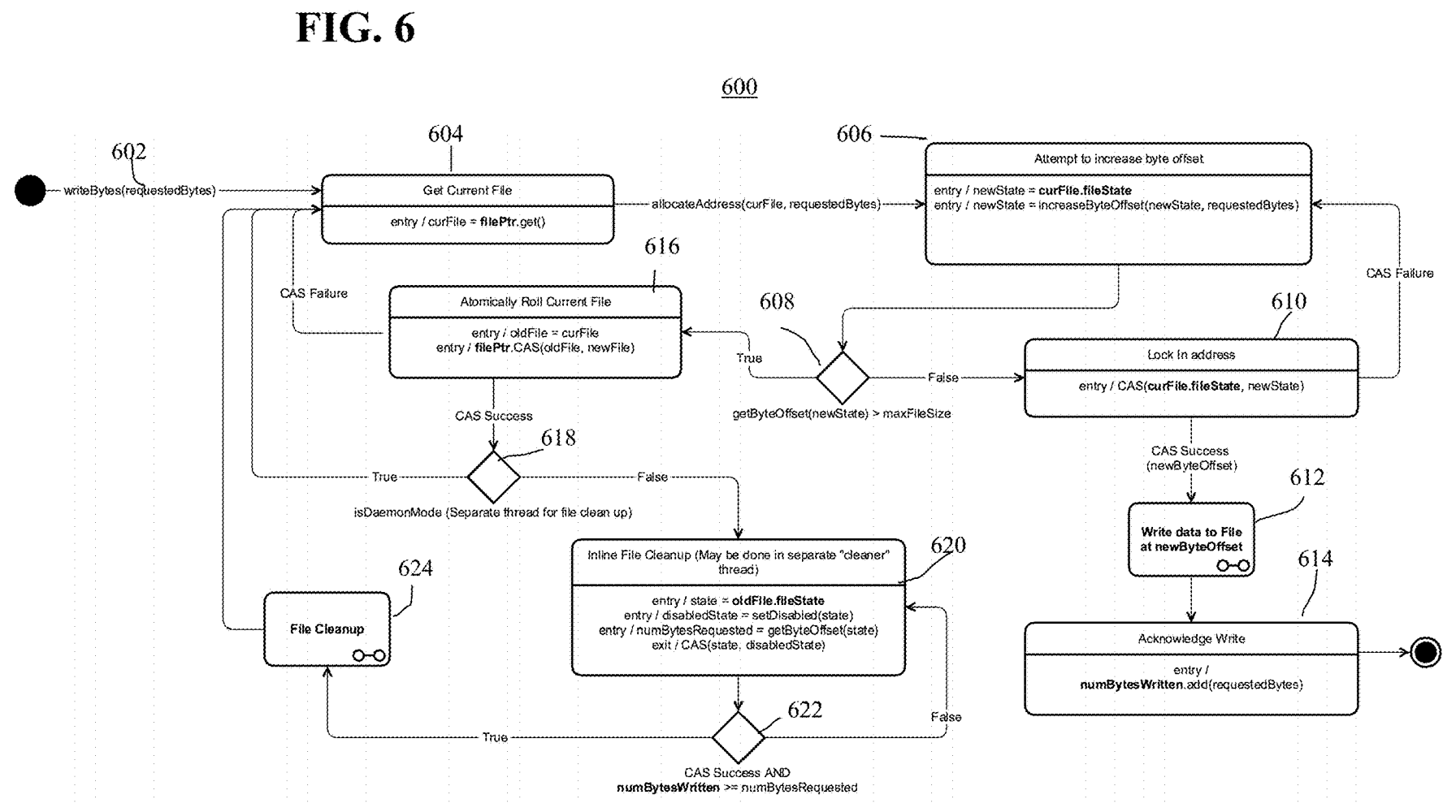

602
writeBytes(requestedBytes)

604
Get Current File
entry / curFile = filePtr.get()

allocateAddress(curFile, requestedBytes)

606
Attempt to increase byte offset
entry / newState = curFile.fileState
entry / newState = increaseByteOffset(newState, requestedBytes)

CAS Failure

616
Atomically Roll Current File
entry / oldFile = curFile
entry / filePtr.CAS(oldFile, newFile)

608
True
False
getByteOffset(newState) > maxFileSize

610
Lock In address
entry / CAS(curFile.fileState, newState)

CAS Failure

CAS Success

618
True
False
isDaemonMode (Separate thread for file clean up)

CAS Success
(newByteOffset)

612
Write data to File at newByteOffset

620
Inline File Cleanup (May be done in separate "cleaner" thread)
entry / state = oldFile.fileState
entry / disabledState = setDisabled(state)
entry / numBytesRequested = getByteOffset(state)
exit / CAS(state, disabledState)

624
File Cleanup

614
Acknowledge Write
entry /
numBytesWritten.add(requestedBytes)

622
True
False
CAS Success AND
numBytesWritten >= numBytesRequested

THREAD SAFE LOCK-FREE CONCURRENT WRITE OPERATIONS FOR USE WITH MULTI-THREADED IN-LINE LOGGING

REFERENCE TO RELATED APPLICATIONS

This application is a continuation under 37 C.F.R. § 1.53(b) of U.S. patent application Ser. No. 14/707,614 filed May 8, 2015, now U.S. Pat. No. 11,829,333, the entire disclosure of which is hereby incorporated by reference.

BACKGROUND

In computer programming, mutual exclusion refers to the requirement of ensuring that no two concurrent processes are in their critical section at the same time; it is a basic requirement in concurrency control, to prevent collisions, race conditions, such as interceding updates, or other synchronization issues. Here, a critical section may refer to a period when the process accesses, e.g., reads from or writes to, a shared resource, such as shared memory, file, or other data storage. A mutex is a program object that allows multiple program threads to share the same resource, such as file access, but not simultaneously. A lock is a synchronization mechanism for enforcing limits on access to a resource in an environment where there may be many threads of execution. A lock is designed to enforce a mutual exclusion concurrency control policy.

Thread safety is a computer programming concept applicable in the context of multi-threaded programs. A piece of code may be considered thread-safe if it only manipulates shared data structures in a manner that guarantees safe execution by multiple threads at the same time. In computer science, a thread of execution may be the smallest sequence of programmed instructions that can be managed independently by a scheduler. Thread safety may be implemented using a Compare and Swap (CAS) operation which compares two values, typically a test value against a value stored in a memory, and, only if equal, stores a new value the memory. CAS operations can be used to ensure that only one thread may change a stored value, accessible to other threads, at any given time.

Most parallel or multi-threaded programming, in some way, may involve the use of locking, at the lowest code levels or elsewhere. Locks are primitives, i.e., a basic computer program code construct/element/segment, that provide mutual exclusion, allowing data structures to remain in consistent states. Without locking, multiple threads of execution may simultaneously modify a data structure. Without a carefully thought out (and usually complex) lock-free algorithm, the result is usually a crash, hang, data corruption or other unintended result as unintended program states are entered. Since the creation of a lock-free algorithm is extremely difficult, most programs use locks.

Generally, a lock is a signal, flag, or other indication that one process or thread is currently utilizing a particular data structure. Other processes/threads must wait until the lock is released or otherwise cleared and then must contend with each other to acquire access to, and then lock, the data structure for themselves, before they are able to perform their desired function with respect to that data structure. Locks effectively serialize access, i.e., enforce a sequential access, to a shared resource. There may be numerous ways to implement locks.

If updating a data structure is slow, one type of lock which may be implemented is a mutex of some kind. These will release control of the processor to the operating system when they block, allowing other threads of execution to run on the processor while the original thread is frozen for an undetermined amount of time. This allows another thread to run, and perhaps make progress whilst the first thread sleeps. This transfer of control consists of a pair of context switches, which are quite a slow operation. Thus, if the lock-hold time is expected to be short, then this may not be the fastest method.

Instead of context switches, a spinlock will “spin”, and repeatedly check to see if the lock is unlocked. Spinning is very fast, so the latency between an unlock-lock pair is small. However, spinning doesn’t accomplish any work, so may not be as efficient as a sleeping mutex if the time spent becomes significant.

When using locks to protect resources or otherwise enforce thread/process synchronization, one must consider lock overhead, even in situations where collisions may be rare, which is the extra resources for using locks, like the memory space allocated for locks, the CPU time to initialize and destroy locks, and the time for acquiring or releasing locks. The more locks a program uses, the more overhead associated with the usage. Lock contention occurs whenever one process or thread attempts to acquire a lock held by another process or thread. The more fine-grained the available locks, the less likely one process/thread will request a lock held by the other. (For example, locking a row rather than the entire table, or locking a cell rather than the entire row). However, the resultant blocking caused by a lock will force another thread/process to wait until the lock is cleared which may impact the performance of the thread/process. If the process/thread holding the lock should terminate or fail without releasing the lock, the waiting process/thread may wait forever.

Locks may be vulnerable to failures and faults that are often very subtle and may be difficult to reproduce reliably or otherwise debug as such failures may be time dependent. One example is the deadlock, where (at least) two threads try to acquire a lock that is held by the other thread and will not give up until it has acquired the other lock.

Furthermore, lock contention limits scalability and adds complexity to a system. The optimal balance between lock overhead and contention may be unique to the problem domain (application) and sensitive to design, implementation, and even low-level system architectural changes. These balances may change over the life cycle of an application and may entail tremendous changes to update (re-balance). Locks may only be composable (e.g., managing multiple concurrent locks in order to atomically delete Item X from Table A and insert X into Table B) with relatively elaborate (overhead) software support and perfect adherence by applications programming to rigorous conventions.

Locks may result in priority inversion whereby a low-priority thread/process holding a common lock can prevent high-priority threads/processes from proceeding. Priority inheritance may be used to reduce priority-inversion duration. The Priority ceiling protocol can be used on uniprocessor systems to minimize the worst-case priority-inversion duration, as well as prevent deadlock.

Locks may result in convoying whereby all other threads may have to wait, if a thread holding a lock is descheduled due to a time-slice interrupt or page fault.

Some concurrency control strategies avoid some or all of these problems. For example, a funnel or serializing tokens can avoid the biggest problem: deadlocks. Alternatives to locking include non-blocking synchronization methods, like lock-free programming techniques and transactional memory. However, such alternative methods often require that the actual lock mechanisms be implemented at a more fundamental level of the operating software. Therefore, they may only relieve the application level from the details of implementing locks, with the problems listed above still needing to be dealt with beneath the application.

BRIEF DESCRIPTION OF THE DRAWINGS

FIG. 2 a block diagram of an exemplary implementation of the system of FIG. 1 for implementing concurrent store operations for multiple threads.

FIG. 5 shows an exemplary implementation according to one embodiment.

FIG. 6 shows another exemplary implementation according to another embodiment.

DETAILED DESCRIPTION

Figure 1:
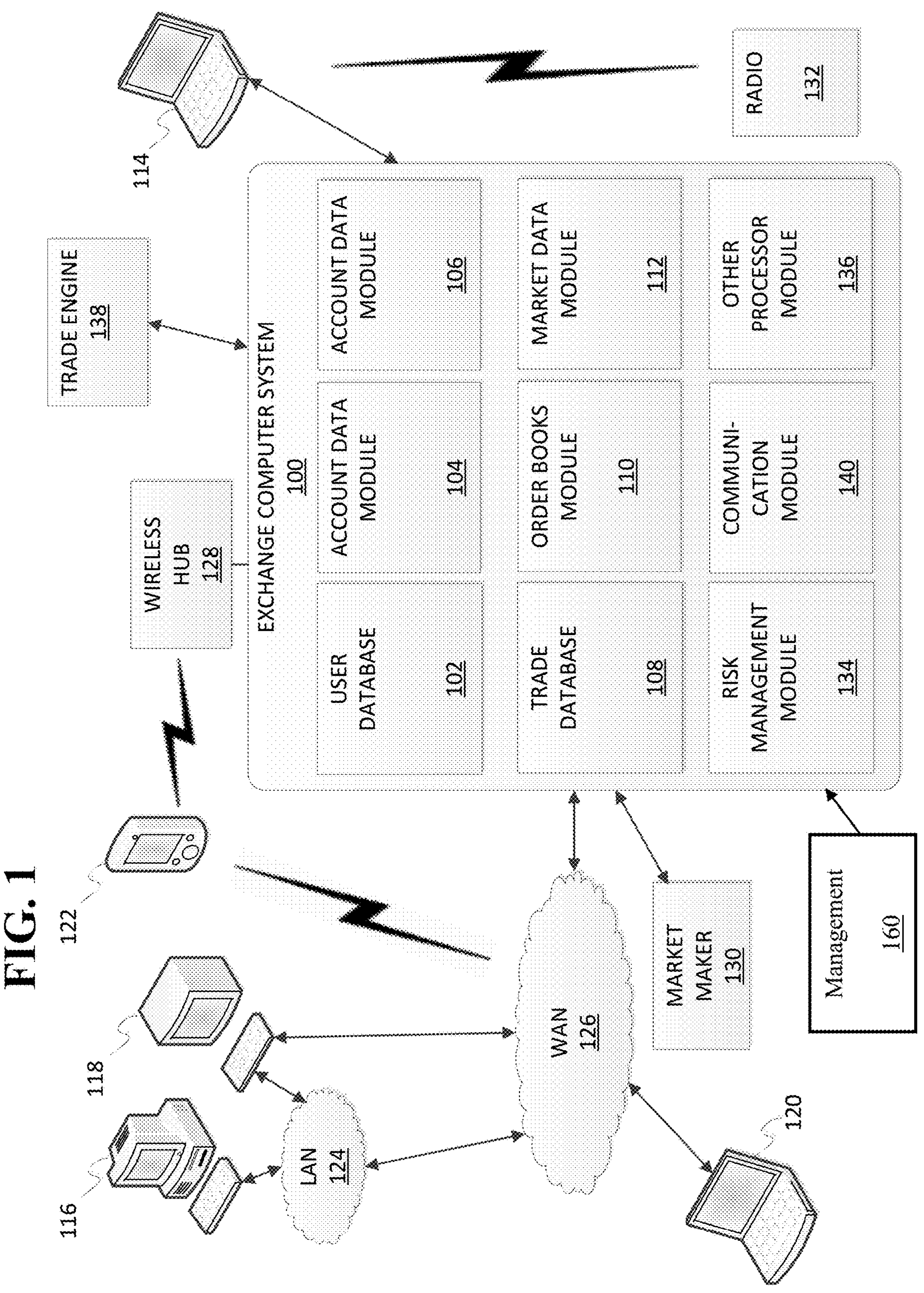
FIG. 1 depicts an illustrative computer network system that may be used to implement aspects of the disclosed embodiments.

The disclosed embodiments generally relate to a mechanism for allowing concurrent access, e.g., write/store operations, to a data structure, e.g. a file or other data store, by multiple processes or threads and, in particular, for allowing concurrent, or otherwise substantially simultaneously, appending of data to a file thereby. Each process/thread requests the amount of space it needs to append its data. Upon request, the disclosed embodiments allocate and reserve the requested amount of space and allow the requesting process/thread to commence its append operation. Subsequent to indication that that the requesting process may commence its append operation, another thread is then free to request space for its needs and commence its append operation concurrently, or otherwise substantially simultaneously, with the previous append operation, i.e. before the prior append operation is completed.

In alternative implementations having a fixed maximum amount of data that a can be stored in a data file, i.e., a "maximum file size," the disclosed embodiments further relate to a mechanism, which may be a part of, or in addition to, the embodiment described above, which efficiently handles creation/opening of new files, referred to as "file rolling," when the current file's maximum size is reached. The disclosed embodiments may provide mechanisms which ensure minimal delay when opening or otherwise creating a new file. It will be appreciated that the disclosed embodiments may operate with files or other resources having an unlimited size, or otherwise characterized by a size large enough to hold all possible data that could be stored in a particular implementation, and thereby not requiring another file or resource.

The disclosed embodiments may be used in conjunction with a system for periodic logging of the operational state of a system, such as a match engine of an electronic trading system, whereby multiple threads, processes, or other programs, referred to as "loggers" or "logging threads" monitor various portion of the operation of the system and record their observations and/or other data indicative thereof in a log data file or other data structure. It will be appreciated that the more granular the monitoring, i.e., the more monitoring threads/process that can be implemented to monitor more parts of the system and/or the rate or frequency at which those parts may be monitored and data indicative thereof recoded, the more useful the overall monitoring function may be. Each thread/process may be monitoring a different portion of the system, and the system may be operating at high speed, thereby generating a significant amount of monitored data in a short amount of time.

While monitoring of system operation may be considered tangential to the overall function of the system, the performance of the monitoring threads/processes may nevertheless impact the performance of the system because those process/threads typically use the same resources, e.g., processor/CPU, memory, etc., as the system they are monitoring. Therefore, it may be desirable that the monitoring threads/processes operate efficiently and with minimal impact on the operation of the system. In particular, as the operation of appending data to a data file may be a relatively time/resource consuming operation, the disclosed embodiments improve the performance of the monitoring threads/processes, and thereby improve the performance of the system being monitored, by minimizing the contention among the monitoring processes/threads for access to the data store/file in which the monitored data is stored to append their monitored data. Using the disclosed embodiments, each process/thread need not wait for another process/thread to complete its append operation before commencing its own append operation.

In one embodiment, the system may comprise a match engine of an electronic trading system and the monitoring threads/processes may continuously monitor and record time stamp data indicative of the timing of particular operations/functions/milestones/states of the system for the purpose of system performance evaluation, problem/defect resolutions, historical data analysis, operational scenario reconstruction, regulatory or administrative audit, or other purpose. However, it will be appreciated that disclosed embodiments may be utilized in conjunction with any system or multi-threaded implementation where multiple processes/threads need to append data to a shared resource, e.g. file or other data store.

As used here, the terms concurrent and/or substantially simultaneously refers to the ability of one thread process to commence, but not necessarily complete, its operation to append data to a file or other resource before another process/thread completes a previously commenced operation to append data to the same file or resource, or otherwise where the operations may overlap in time.

The disclosed embodiments may be implemented separately from, or as part of, the hardware and/or an operating system upon which the monitored system is implemented, as part of the monitored system, as part of the monitoring/logging system, or combinations thereof and all such implementations are contemplated. In one embodiment, the disclosed functionality may be implemented as part of a file management system or other supervisory process to which other threads/processes request file access. The disclosed embodiments may be implemented, as described below, as computer program code stored in a memory or other volatile or non-volatile data storage device and/or as a hardware component such as a programmable or reprogrammable logic device or an application specific integrated circuit.

The disclosed embodiments particularly relate to allowing multiple threads/processes to concurrently append new data to a file, i.e., add new data to, and thereby, increase the size of the file. Using the disclosed embodiments, the output of multiple threads may be captured in single file or set of files with minimal impact on the performance of the system being monitored as was described. Where the output of the threads may be interrelated and characterized by an order, e.g., sequence or time order, in which the output was generated by each thread, capturing to a single file, or set of files, may require less post processing of the collected data. For example, an alternative solution to the resource contention issue described above may be to simply provide a separate resource/file for each thread to write to. However, where the data is interrelated such as via an order, such as a time order or sequence, these separate files may need to be post processed to combine the data for subsequent analysis or processing. This may not be a trivial task. Further, the maintenance of multiple open files by the operating system on which the monitoring is occurring may itself cause performance degradation.

In accordance with aspects of the disclosure, systems and methods are disclosed for monitoring operations of an electronic trading system using a monitoring system having multiple logging processes/threads monitoring various portions of the electronic trading system and concurrently storing the monitored data in a common log file or other data store in accordance therewith. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframes, desktops, or other computers, such as the computer 400 described below with respect to FIG. 4. A user database 102 may be provided which includes information identifying traders and other users of exchange computer system 100, such as account numbers or identifiers, usernames, and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The Exchange computer system 100 may include a management module 160, logically external to the system 100, e.g., external to the modules therein, i.e., supervisory to, or logically within the system 100, which may implement the disclosed mechanisms as will be described with reference to FIG. 2. In particular, the modules described above, along with the management module 160, may be implemented as multiple processing threads executing on one or more processors which may share data via a common memory or otherwise. However, as was discussed above, the disclosed mechanisms may be implemented at any logical and/or physical point(s) within the exchange computer system 100. The monitoring system may be implemented by multiple operating processes, threads, tasks, or other computer program code construct, logically distributed, or otherwise coupled throughout the exchange computer system 100 to monitor different parts, e.g., modules, thereof and record data regarding the operation thereof in a log file or other data store. The data store may include one or more data files, records or other structures or resources for storing data. As described herein, the disclosed embodiments enable multiple threads/processes to append their data to the same data store, however that data store may change, e.g., a new data store may be provided once the storage capacity of the current data store is reached. For example, the data store may be a data file having a maximum capacity. As the threads/processes store data into the data file, the capacity of the data file is monitored. Once the capacity of the data file has been exhausted, the data file is closed and a new data file is opened, referred to as "rolling", and the threads/processes continue to write their data to the new data file, as will be described. Accordingly, as used herein, the terms data store, data file, etc., may refer to the current data store or file, to which the multiple threads are currently storing their data, of a set of at least one data store or file, wherein each data store or file of the set may be created as needed and/or created in advance.

FIG. 2 depicts a block diagram of a management module 160 according to one embodiment, which in an exemplary implementation, is implemented as part of the exchange computer system 100 described above. As used herein, an exchange 100 includes a place or system that receives and/or executes orders. In particular, FIG. 2 shows a system 200 for controlling storage, i.e., appending, of data, such as log data, in a selected one of at least one data store 214, e.g., a data file or other data storage construct, coupled with a processor 202. The selected one of the at least one data store 214 may be stored in a memory 204 or elsewhere. The processor 202, memory 204 and/or data store 214 may be implemented by a processor 402 and memory 404 as described below with respect to FIG. 4.

The system 200 further includes a request receiver 206 or request input, which may be implemented as a separate hardware component or as first logic 206 stored in the memory 204 and executable by the processor 202 to cause the processor 202, subsequent to receipt of a first request from a first requestor (not shown), e.g., one of the multiple threads which implement the monitoring system 160, to store a first amount, e.g., specified in bytes, of first data in the selected data store 214, to receive a second request from a second requestor (not shown), e.g., another of the threads of the management module/monitoring system 160, to store a second amount of second data in the selected data store, wherein at the time of receipt of the second request, the first requestor has at least commenced, or has been allowed to commence, storing the first data to the selected data store 214. It will be appreciated that upon receipt of the second request, the first requestor may have not completed storing the first data to the selected data store.

The system 200 further includes an offset calculator 208 coupled with the request receiver 206, which may be implemented as second logic 208 stored in the memory 204 and executable by the processor 202 to cause the processor 202 to, based on the second amount, allocate space in the selected data store 214 sufficient to receive the second data to be stored by the second requestor.

In one embodiment, the offset calculator 208 may be further operative to compute a location in the selected data store 214 at which the second requestor is allowed to store the second data based on the first amount. In one embodiment, the offset calculator 208 may allocate space in the selected data store 214 to the second requestor at the location based on the first amount and spanning a range of locations based on the second amount.

In one embodiment, the offset calculator 208 may be further operative to receive a confirmation of the completion of the storage of the first data from the first requestor and the completion of the storage of the second data from the second requestor.

The system 200 further includes a request approver 210 coupled with the offset calculator 208, which may be implemented as third logic 210 stored in the memory 204 and executable by the processor 202 to cause the processor 202 to, upon allocation of space by the offset calculator, indicate to the second requestor that they may store the second data to the selected data store 214. Whereby, responsive to the indication by the request approver 210, the second requestor is operative to commence storing the second data to the selected data store 214. It will be appreciated, as will be described, that under certain conditions, the request approver 210 may be caused to withhold approval to, or otherwise prevent, the requestor to commence its storage of data to the data store 214.

In one embodiment, the offset calculator 208 may be further operative to determine if the second amount of data will exceed an available capacity of the selected data store 214 and, if the second amount of data will exceed the available capacity of the selected data store 214, cause the request approver 210 to prevent the second requestor from storing the second data to the selected data store 214. In one embodiment, this may force the second requestor to resend its request. As will be described in more detail below, upon determining that the selected data store 214 capacity has been reached, a new selected data store 214 may be opened and the old selected data store 214 is closed. In particular, the offset calculator 208, upon receipt of the first request, may be operative to determine whether the first amount of data would exceed an available capacity of the selected data store 214 and if so, cause the selected data store 214 to be closed and another data store 214 of the at least one data store 214 to be selected. Until the new selected data store 214 is ready to receive data, requests to store data may be prevented and, thereby the requestors are forced to resend their requests. Once the new selected data store 214 is ready, the requests will proceed as described until the capacity of the selected data store 214 is again exhausted.

In one embodiment, upon receipt of the second request, the offset calculator 208 is further operative, prior to the allocation of space in the selected data store 214 for the second data, to determine if the previously selected data store 214 has been closed, e.g., that any other previously approved requestors have completed their storing of data into the data store 214, and a newly selected data store 214 is ready, and if the previously selected data store 214 has been closed and the newly selected data store 214 is ready, allocate space in the selected data store 214 sufficient to receive the second data to be stored by the second requestor, and otherwise cause the request approver 210 to prevent the second requestor from storing the second data to the selected data store 214. In this embodiment, requestors must wait for the old data store 214 to be closed and for the new data store 214 to be created.

In an alternative embodiment, upon receipt of the second request, the offset calculator 208 is further operative, prior to the allocation of space in the selected data store 214 for the second data, to determine if the newly selected data store 214 is ready, and if the newly selected data store 214 is ready, allocate space in the selected data store sufficient to receive the second data to be stored by the second requestor, and otherwise cause the request approver 210 to prevent the second requestor from storing the second data to the selected data store 214. In this embodiment, a requestor need only wait for the new data store 214 to be created but does not need to wait for the old data store 214 to be closed, e.g., for any outstanding pending store operations to be completed, which may significantly decrease delay and improve performance.

Figure 3:
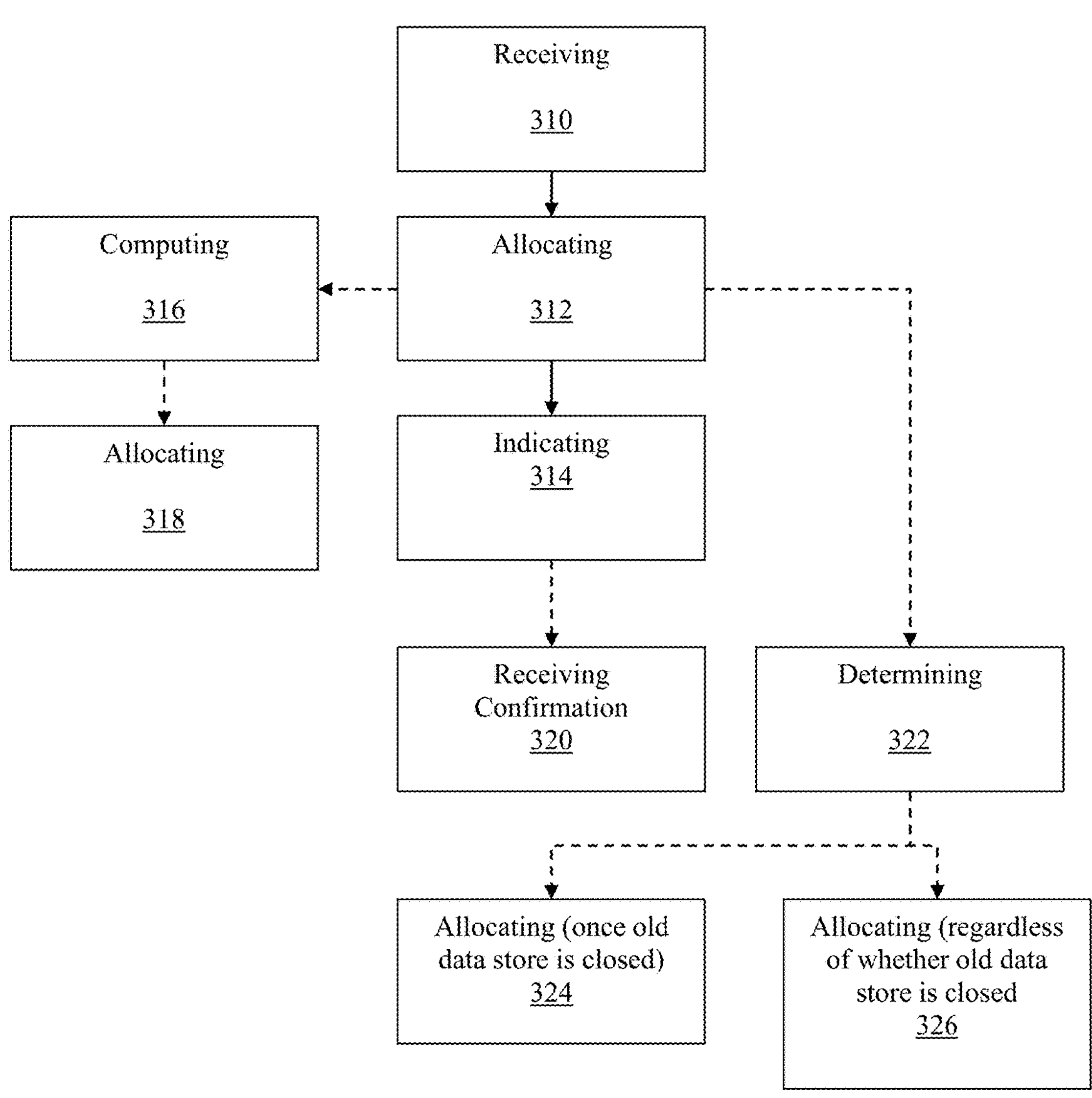
FIG. 3 depicts a flow chart showing operation of the system of FIG. 2.

FIG. 3 depicts a flow chart showing operation of the system 200 of FIG. 2. In particular, FIG. 3 shows a method of controlling storage of data in a selected one of at least one data store. The operation of the system 200 includes: receiving, subsequent to receipt of a first request from a first requestor to store a first amount of first data in the selected data store, a second request from a second requestor to store a second amount of second data in the selected data store, wherein at the time of receipt of the second request, the first requestor has at least commenced storing the first data to the selected data store (Block 310); allocating, based on the second amount, space in the selected data store sufficient to receive the second data to be stored by the second requestor (Block 312); and indicating, upon allocation of space by the offset calculator, to the second requestor that they may store the second data to the selected data store (Block 314); and whereby, responsive to the indication by the request approver, the second requestor is operative to commence storing the second data to the selected data store.

It will be appreciated that, upon receipt of the second request, the first requestor has not completed storing the first data to the selected data store.

The operation of the system 20 may further include computing a location in the selected data store at which the second requestor is allowed to store the second data based on the first amount (Block 316).

The operation of the system 200 may further include allocating space in the selected data store to the second requestor at the location based on the first amount and spanning a range of locations based on the second amount (Block 318).

The operation of the system 200 may further include receiving a confirmation of the completion of the storage of the first data from the first requestor and the completion of the storage of the second data from the second requestor (Block 320).

The operation of the system 200 may further include determining if the second amount of data will exceed an available capacity of the selected data store and, if the second amount of data will exceed the available capacity of the selected data store, causing the request approver to prevent the second requestor from storing the second data to the selected data store (Block 322).

The operation of the system 200 may further include determining, upon receipt of the first request, whether the first amount of data would exceed an available capacity of the selected data store and if so, causing the selected data store to be closed and another data store of the at least one data store to be selected (Block 322).

The operation of the system 200 may further include determining, upon receipt of the second request and prior to the allocation of space in the selected data store for the second data, if the previously selected data store has been closed and newly selected data store is ready, and if the previously selected data store has been closed and newly selected data store is ready, allocating space in the selected data store sufficient to receive the second data to be stored by the second requestor, and otherwise preventing the second requestor from storing the second data to the selected data store (Block 324).

The operation of the system 200 may further include determining, upon receipt of the second request and prior to the allocation of space in the selected data store for the second data, if the newly selected data store is ready, and if the newly selected data store is ready, allocating space in the selected data store sufficient to receive the second data to be stored by the second requestor, and otherwise preventing the second requestor from storing the second data to the selected data store (326).

Referring to FIG. 5, there is shown an exemplary implementation 500 of the system 200 according to one embodiment. This depicted implementation may be a process, an instance of which is initiated with each received request as will be described. As such, multiple instances of the depicted process may be executing at any given time. The implementation 500 includes an input 502, which may be implemented by the request receiver 206, for receiving a request from a requestor, e.g., a process/thread requesting permission to write to the data store 214. The request includes a specification of the number of bytes the requesting process wishes to append to the data store 214. Upon receipt of the request, the implementation 500 first checks 504 to see if the data store 214 is the process of being swapped out for a new data store 214, e.g., because the capacity of the prior data store 214 has been exhausted. If the data store 214 is being swapped, the implementation 500 waits for the swap to be completed and the new data store 214 to be made available. If the data store 214 is not being swapped, the implementation 500 next checks 506 to see if the requested number of bytes to be written will fit in the remaining available capacity of the data store 214. If the requested number of bytes will fit, the implementation 500 next determines 508 whether current state of the data store is expected, i.e., that the current offset, or location of the most recently prior written data, has not changed due to, for example, the implementation 500, or another instance thereof, processing an allocation request from another thread/process. This determination 500 is handled using a Compare and Swap (CAS) operation which compares a value, e.g., the expected data store 214 offset with a value in memory and if they are equal, stores a new value, e.g., the prior offset incremented by the number of bytes of the new request. A successful CAS operation effectively moves the location of the last written data to account for the yet-to-be-written data of the present request thereby allocating and reserving this space for use thereby. If the CAS operation is not successful, the implementation 500 starts over 504 to continue checking until it is successful. If the CAS operation is successful, the implementation 500 accounts, e.g., by incrementing a counter, for the thread/process as being allowed to write to the data store 214 and the requesting thread/process is allowed 510 to write its data in the allocated space of the data store 214. Once the requesting thread/process as completed its storage of the data, it will acknowledge to the implementation 500 that it has completed upon receipt of which, the implementation 500 will account 512 for the cumulative number of bytes of data actually written to the data store 214, e.g., by accumulating or otherwise incrementing a counter by the requested number of bytes.

If the number of bytes of data requested to be written will not fit 506 in the current data store 214, a new data store 214 must be created or otherwise provided, referred to as a “roll” or “rolling the data store”. If this is the case, the implementation 500 then checks 514 the cumulative number of bytes actually written to the current data store 214 against the allocated/number of bytes as indicated by the present offset value to determine whether any other threads/processes, previously approved to store data, are still in the process of storing their data in the current data store. If the cumulative number of bytes written does not equal the number of allocated bytes, then another thread/process must still be storing its data and the implementation 500 start over 504 to check again. This will continue until it is determined that all other process/threads have completed storing their data to the current data store 214, i.e., that the cumulative number of bytes written equals the number of bytes allocated. The implementation 500 next checks 516 to see if another instance of the implementation 500 is already swapping out the old data store 214 for a new data store 214. This may be accomplished using a CAS operation on a stored common variable indicating when the data store 214 is in the process of being swapped out. If a data store 214 swap is already in process, e.g., the CAS operation fails, the implementation 500 again starts over 504. If the data store 214 swap is not already in process, a swap/roll is initiated 518 and the implementation 500 again starts over 504. By starting over 504, the implementation 500 simply repeats the operations and determinations described above until the requesting process/thread can finally be approved to store its data in the data store 214.

Referring to FIG. 6, there is shown another exemplary implementation 600 of the system 200 according to another embodiment. As with the prior exemplary implementation, this depicted implementation may be a process, an instance of which is initiated with each received request as will be described. As such, multiple instances of the depicted process may be executing at any given time. In the depicted implementation 600, a given requesting process/thread which wishes to store data to a data store 214 which has insufficient remaining available capacity need to not wait for that data store 214 to be closed, e.g., for all pending approved store operations of other requesting threads/processes to complete, but only for the new data store to be created and made available. This decreases delay in approving a thread/process's store operation and improves the performance thereof.

The implementation 600 includes an input 602, which may be implemented by the request receiver 206, for receiving a request from a requestor, e.g., a process/thread requesting permission to write to the data store 214. The request includes a specification of the number of bytes the requesting process wishes to append to the data store 214. Upon receipt of the request, the implementation 600 first obtains 604 an indicator of, e.g., pointer to, the current data store 214. As this implementation 600 allows for multiple data stores 214 to be in use at a given time, each active data store is identified by an indicator, e.g., a pointer, which identifies at least the starting location otherwise where the identified data store 214 is located, e.g., in a memory 404. Once the location of the data store 214 is known, the implementation 600 attempts 606 to allocate space in the data store 214 for the amount of data requested by the requestor. The implementation 600 then determines 608, e.g., using a CAS operation, whether the data store 214 has sufficient remaining available capacity for the requested amount of data to be stored. If sufficient capacity exists in the data store 214, the allocated amount of space in the data store 214 is incremented 610 to account for the amount of data to be stored by the requestor. This is done using a CAS operation, or a similar one or more operations, which first checks to ensure another requesting thread/process is not already requesting an allocation in the data store 214 in the about-to-be allocated space, e.g., that the expected current offset into the data store 214 has not changed. If another thread/process is requesting an allocation to that same area of the data store 214, e.g., the CAS operation fails, the implementation 600 returns to attempt 606 the allocation again. If, however, no other thread/process is currently writing to the allocated area of the data store 214, e.g. the CAS operation succeeds, the data store 214 offset is incremented by the requested number of bytes to written by the requestor, effectively moving the location of the last written data to account for the yet-to-be-written data of the present request thereby allocating and reserving this space for use thereby. The implementation 600 then allows 612 the requesting thread/process to write its data in the allocated space of the data store 214. Once the requesting thread/process as completed its storage of the data, it will acknowledge to the implementation 600 that it has completed upon receipt of which, the implementation 600 will account 614 for the cumulative number of bytes of data actually written to the data store 214, e.g., by accumulating or otherwise incrementing a counter by the requested number of bytes.

If the implementation 600 determines 608 that there is insufficient remaining available capacity in the data store 214 for the requested amount of data, the implementation 600 begins the process of opening a new data store 214. The implementation 600 will attempt to perform a CAS operation on the identifier of the old data store 214 with the new data store 214. If the CAS operation is successful in updating the identifier, the implementation 600 will begin closing the old data store 214 620. If the CAS operation is unsuccessful, the implementation 600, according to one embodiment, may return to the initial input stage 604 to again attempt to satisfy the requestor. Alternatively, or in parallel 618 therewith, the implementation 600 may determine 622 whether all previously approved pending store operations have completed to the old data store 214 by comparing the amount of allocated storage in the data store 214 with the cumulative amount of data actually written thereto. If not equal 622, i.e., there are still in-process store operations, the implementation 600 waits 620 for them all to complete. Once completed 622, the old data store 214 is closed 624 and the implementation 600 returns to the input stage. If the handling of the old data store 214 was performed in parallel, e.g., as a separate concurrent process, with the rest of the implementation 600, the requestor's request will have already been processed as described above, with respect to the new data store 214, thereby alleviating any delay in awaiting completion of pending store operations to the old data store.

One skilled in the art will appreciate that one or more processes, threads, tasks, modules, or implementations described herein may be implemented using, among other things, a tangible computer-readable medium comprising computer-executable instructions (e.g., executable software code). Alternatively, modules may be implemented as software code, firmware code, hardware, and/or a combination of the aforementioned. For example, the modules may be embodied as part of an exchange 100 for financial instruments.

As will be appreciated, the disclosed embodiments described above improve the technology of data processing and computer implemented system performance and, in particular, the monitoring/logging of information, of a monitored system. By allowing for concurrent storage of data to a common data store, the disclosed embodiments eliminate the need for file locks or other synchronization/serialization techniques, thereby improving performance of the monitoring system and, thereby, the system being monitored. Furthermore, the disclosed embodiments minimize delay incurred due to swapping the common data store, when it reaches its capacity, for a new data store which further improves the performance of the monitoring system and, thereby, the system being monitored. The disclosed embodiments provide the described performance improvement while allowing for the creation of a single log file containing the data from the multiple monitoring threads/processes. This alleviates the need, and the necessary resources, to post-process numerous log files in order to combine the thread/process output for further analysis. It will be appreciated that by improving the performance of the monitoring system, the performance of the system being monitored may be improved and/or additional and/or more granular monitoring may be performed without impacting the performance of the monitored system.

Figure 4:
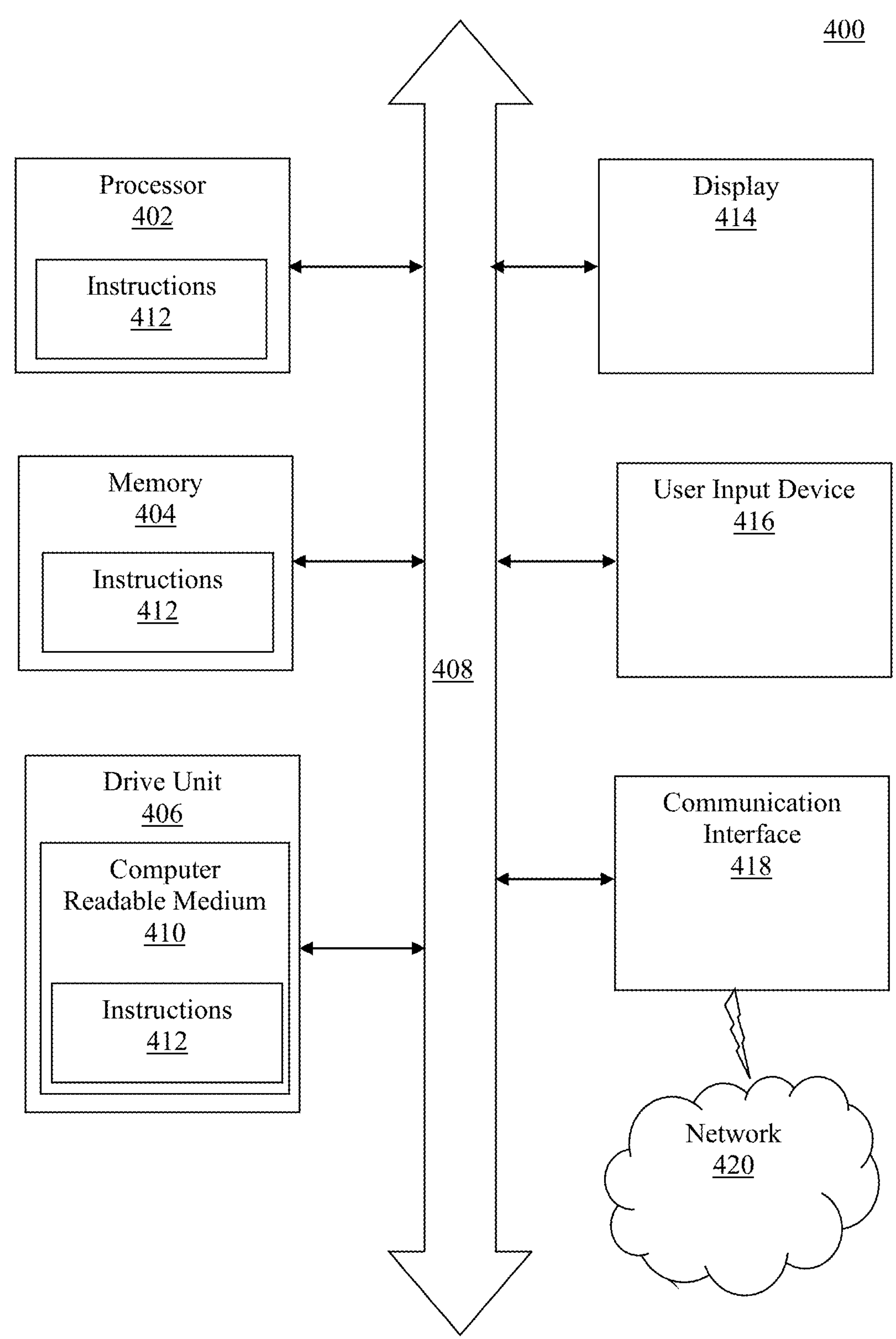
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video, or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include but is not limited to computer readable storage media such as various types of volatile and non-volatile storage media, including but not limited to random access memory, read-only memory, programmable read-only memory, electrically programmable read-only memory, electrically erasable read-only memory, content addressable memory, flash memory, magnetic tape or disk, optical media, and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control, or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g., software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images, or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:

a processor; and a memory coupled therewith, wherein the memory comprises computer executable instructions operative to cause the processor to:

subsequent to receipt of a first request, from a first thread, append a first amount of first data in a selected data store beginning at a first location, receive a second request, from a second thread, to append a second amount of second data in the selected data store, wherein at a time of receipt of the second request, the first thread has at least begun appending the first data to the selected data store beginning at the first location;

determine, upon receipt of the second request, that the second amount of the second data does not exceed an available capacity of the selected data store;

compute, upon determination that the second amount does not exceed the available capacity of the selected store, based on the first location and the first amount, a second location in the selected data store, offset from the first location by the first amount;

determine that the second location is ready for appending by the second thread;

allocate space in the selected data store beginning at the computed second location sufficient to receive the second amount of the second data to be appended by the second thread; and upon computation of the second location and allocation of space, cause the second thread to append the second data to the selected data store beginning at the computed second location, whereby, substantially simultaneously, the second thread commences appending the second data to the selected data store beginning at the computed second location at least before the appending, by the first thread, of the first data to the selected data store beginning at the first location is completed.

2. The system of claim 1, wherein the second thread begins appending the second data to the selected data store beginning at the computed second location at least before the appending, by the first thread, of the first data to the selected data store is completed.

3. The system of claim 1, wherein upon receipt of the second request, the first thread has not completed appending the first data to the selected data store.

4. The system of claim 1, wherein the computer executable instructions are further operative to cause the processor to receive a confirmation of the completion of the appending of the first data from the first thread and the completion of the appending of the second data from the second thread.

5. The system of claim 1, wherein the computer executable instructions are further operative to cause the processor to:

determine that the second amount of the second data will exceed an available capacity of the selected data store; and cause a prevention of the second thread from appending the second data to the selected data store.

6. The system of claim 1, wherein, upon receipt of the first request, the computer executable instructions are further operative to cause the processor to:

determine that the first amount of the first data exceeds an available capacity of the selected data store; and cause the selected data store to be closed and a new data store to be selected.

7. The system of claim 6, wherein, upon receipt of the second request, the computer executable instructions are further operative to cause the processor, prior to the allocation of space in the newly selected data store for the second data, to:

determine that the previously selected data store is closed and that the newly selected data store is ready; and allocate space in the newly selected data store sufficient to receive the second data to be appended by the second thread.

8. The system of claim 6, wherein, upon receipt of the second request, the computer executable instructions are further operative to cause the processor, prior to the allocation of space in the newly selected data store for the second data, to:

determine that the previously selected data store is not closed and that newly selected data store is not ready; and cause a prevention of the second thread from appending the second data to the newly selected data store.

9. The system of claim 6, wherein, upon receipt of the second request, the computer executable instructions are further operative to cause the processor, prior to the allocation of space in the newly selected data store for the second data, to:

determine that the newly selected data store is ready, and allocate space in the selected data store sufficient to receive the second data to be appended by the second thread.

10. The system of claim 6, wherein, upon receipt of the second request, the computer executable instructions are further operative to cause the processor, prior to the allocation of space in the newly selected data store for the second data, to:

determine that the newly selected data store is not ready, and cause a prevention of the second thread from appending the second data to the newly selected data store.

11. The system of claim 1, wherein at least one of the first and second threads is implemented by another processor.

12. A method comprising:

receiving, by a processor, subsequent to receipt of a first request, from a first thread, to append a first amount of first data in a selected data store beginning at a first location, a second request, from a second thread, to append a second amount of second data in the selected data store, wherein at a time of receipt of the second request, the first thread has at least begun appending the first data to the selected data store beginning at the first location;

determining, by the processor, upon receiving the second request, that the second amount of the second data does not exceed an available capacity of the selected data store;

computing, by the processor, upon determining that the second amount does not exceed the available capacity of the selected store, based on the first location and the first amount, a second location in the selected data store, offset from the first location by the first amount;

determining, by the processor, that the second location is ready for appending by the second thread;

allocating, by the processor, space in the selected data store beginning at the computed second location sufficient to receive the second amount of the second data to be appended by the second thread; and causing, by the processor, upon computing the second location and allocation of allocating the space, the second thread to append the second data to the selected data store beginning at the computed second location, whereby, substantially simultaneously, the second thread commences appending the second data to the selected data store beginning at the computed second location before the appending, by the first thread, of the first data to the selected data store is completed.

13. The method of claim 12, wherein, the second thread begins appending the second data to the selected data store beginning at the computed second location at least before the appending of the first data to the selected data store by the first thread is completed.

14. The method of claim 12, wherein upon receipt of the second request, the first thread has not completed appending the first data to the selected data store.

15. The method of claim 12, further comprising, receiving, by the processor, a confirmation of the completion of the appending of the first data from the first thread and the completion of the appending of the second data from the second thread.

16. The method of claim 12, further comprising:

determining, by the processor, that the second amount of data will exceed an available capacity of the selected data store; and causing, by the processor, a prevention of the second thread from appending the second data to the selected data store.

17. The method of claim 12, further comprising:

determining, by the processor, upon receipt of the first request, that the first amount of the first data exceeds an available capacity of the selected data store; and causing, by the processor, the selected data store to be closed and a new data store to be selected.

18. The method of claim 17, further comprising:

determining, by the processor, upon receipt of the second request and prior to the allocation of space in the newly selected data store for the second data, that the previously selected data store is closed and that the newly selected data store is ready; and allocating, by the processor, upon determining that the newly selected data store is ready, space in the newly selected data store sufficient to receive the second data to be appended by the second thread.

19. The method of claim 17, further comprising:

determining, by the processor, upon receipt of the second request and prior to the allocation of space in the newly selected data store for the second data, that the previously selected data store is not closed and that the newly selected data store is not ready; and causing, by the processor, a prevention of the second thread from appending the second data to the newly selected data store.

20. The method of claim 17, further comprising, upon receipt of the second request and prior to the allocation of space in the newly selected data store for the second data:

determining, by the processor that the newly selected data store is ready, and allocating, by the processor, space in the newly selected data store sufficient to receive the second data to be appended by the second thread.

21. The method of claim 17, further comprising, upon receipt of the second request and prior to the allocation of space in the newly selected data store for the second data:

determining, by the processor that the newly selected data store is not ready, and causing, by the processor, a prevention of the second thread from appending the second data to the newly selected data store.

22. A system comprising:

means for receiving, subsequent to receipt of a first request from a first thread to append a first amount of first data in a selected data store beginning at a first location, a second request from a second thread to append a second amount of second data in the selected data store, wherein at a time of receipt of the second request, the first thread has at least begun appending the first data to the selected data store beginning at the first location;

means for determining, upon receiving the second request, that the second amount of the second data does not exceed an available capacity of the selected data store;

means for computing, upon determining that the second amount does not exceed the available capacity of the selected store, based on the first location and the first amount, a second location in the selected data store, offset from the first location by the first amount;

means for determining that the second location is ready for appending;

means for allocating space in the selected data store beginning at the computed second location sufficient to receive the second amount of the second data to be appended by the second thread; and means for causing, upon computing the second location and allocating the space, the second thread to append the second data to the selected data store beginning at the computed second location, whereby, substantially simultaneously, the second thread commences appending the second data to the selected data store beginning at the computed second location before the appending, by the first thread, of the first data to the selected data store beginning at the first location is completed.

* * * * *